United States Patent [19]

Gaudreault

[11] Patent Number: 4,462,438
[45] Date of Patent: Jul. 31, 1984

[54] DUAL HEAD DELIMBER

[75] Inventor: Pierre Gaudreault, Alma, Canada

[73] Assignee: Les Equipments Forestiers SLR Inc., Quebec, Canada

[21] Appl. No.: 448,436

[22] Filed: Dec. 10, 1982

[51] Int. Cl.³ .............................................. B27L 1/00
[52] U.S. Cl. ................................... 144/2 Z; 144/343
[58] Field of Search ...................... 144/2 Z, 3 D, 343

[56] References Cited

U.S. PATENT DOCUMENTS 4,276,918  7/1981  Sigouin .............................. 144/2 Z

FOREIGN PATENT DOCUMENTS 1116053  1/1982  Canada .............................. 144/2 Z 701800  12/1979  U.S.S.R. .............................. 144/2 Z Primary Examiner—W. D. Bray
Attorney, Agent, or Firm—Cushman, Darby & Cushman

[57] ABSTRACT

The disclosure herein describes a dual head delimber for mounting to one end of the longitudinal boom of a machine of the type used for delimbing felled trees; it comprises a cradle structure to which are pivotally mounted two sets of clamps, the sets being juxtaposed to one another; to assist in concurring the butt ends of the grasped trees, the sets of clamps are mounted at an angle on either side of the longitudinal axis of the boom to define a V-shaped arrangement. The invention is also concerned with an apparatus for delimbing felled trees which includes such dual head delimber.

14 Claims, 8 Drawing Figures

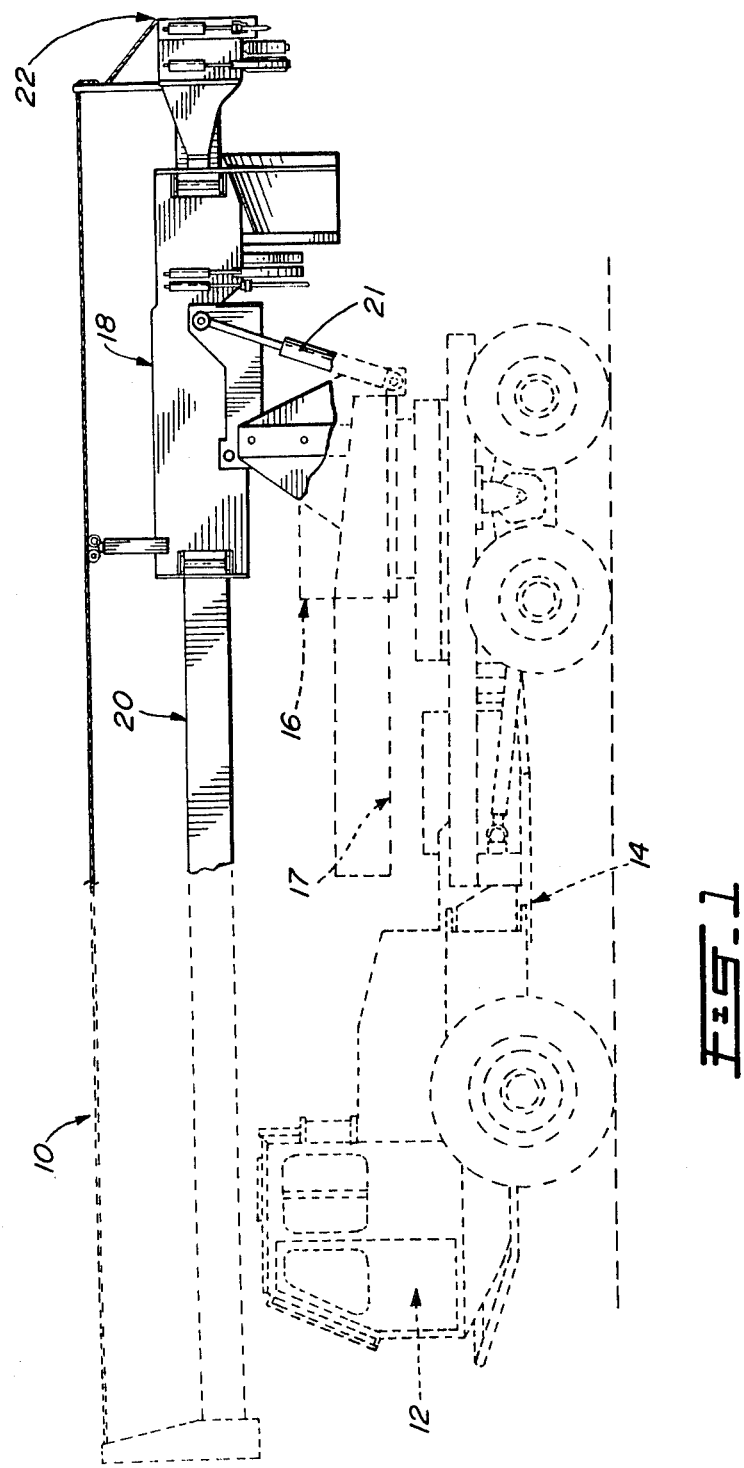

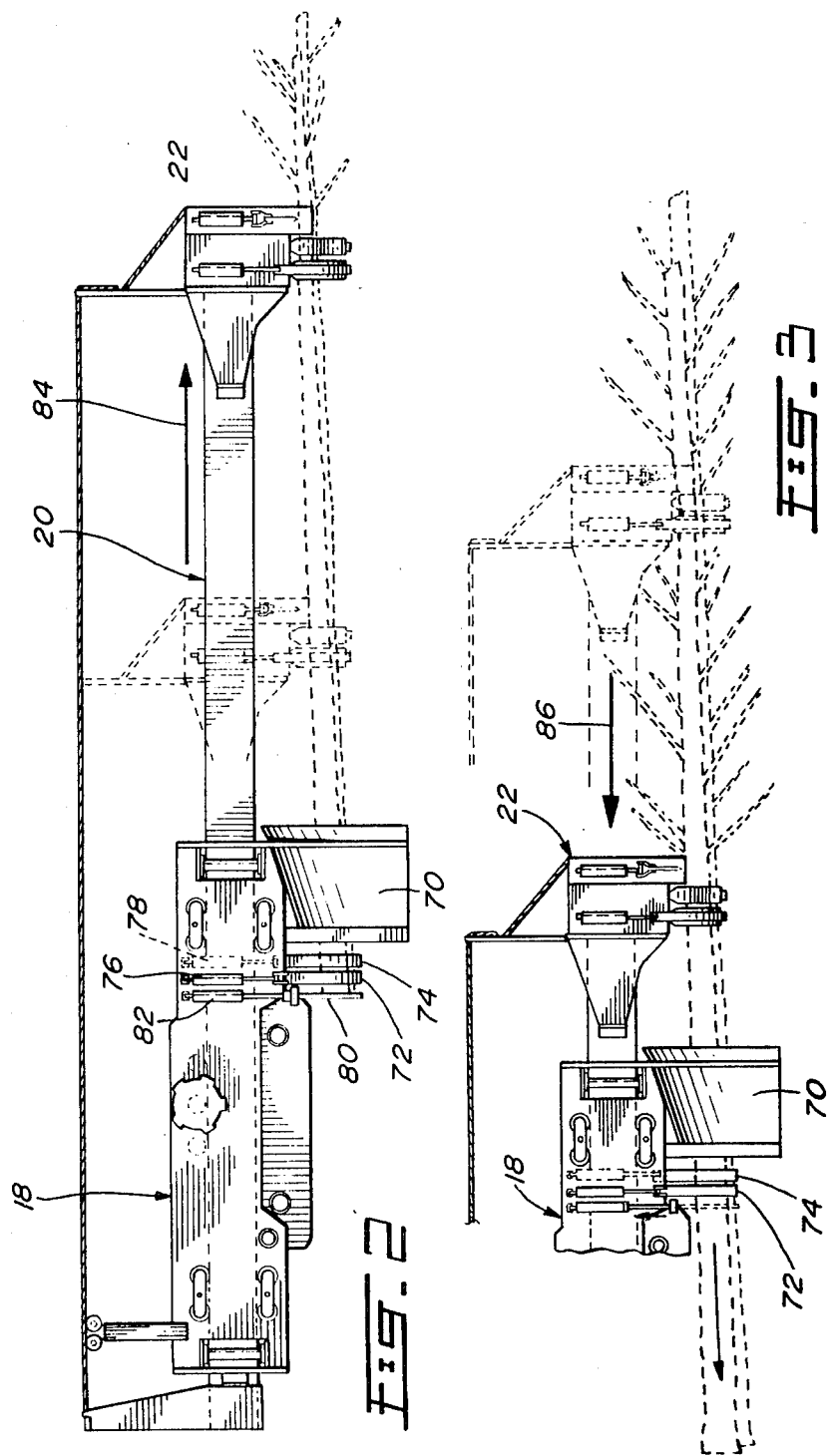

DUAL HEAD DELIMBER

FIELD OF THE INVENTION

The present invention pertains to an apparatus for delimbing felled trees and, more particularly, pertains to a dual head delimber which is mounted at one end of a boom mounted on such apparatus.

BACKGROUND OF THE INVENTION

One example of present tree processing units may be found described in Canadian Pat. No. 1,055,366 issued May 29, 1979 to Roger Sigouin. Such apparatus comprises a boom processing unit, supported on a vehicle, which enables extension and retraction of a longitudinal boom having, at one end, tree gripping and debranching elements adapted to grasp a felled tree and to remove the branches therefrom. Further tree gripping elements are mounted to the unit and are adapted to grasp the tree trunk adjacent its butt end; debranching is carried out by extending the boom as the first gripping elements loosely hold the tree. The present method of delimbing trees consists of stationing the vehicle adjacent to limbed trees piled along a road side, grasping the trees, delimbing over a limb covered area and piling trees over another area.

The actual productivity of such apparatus depends on various factors such as the number of trees which can be picked-up each time, the skill level of the operator, the tree size and length.

OBJECTS AND STATEMENT OF THE INVENTION

It is an object of the invention to provide on a vehicle of the type described a delimbing apparatus which increases to a substantial degree the productivity of the tree delimbing process.

This is achieved by providing on one end of the longitudinal displaceable boom, a dual head delimber which simultaneously grasp twice as much felled trees as conventional devices can and which allows the simultaneous delimbing operation of both stacks of grasped trees.

The present invention, therefore, relates to a dual head delimber which comprises: a cradle structure adapted to be fixedly mounted to one end of the boom; two sets of clamp means pivotally mounted to the cradle structure, the sets being juxtaposed to one another; and driving means mounted in the cradle structure and connected to the clamp means for pivoting the clamp means of each set towards and away from one another to grapple one or more felled trees for delimbing.

In one form of the invention, the dual head arrangement consists of a pair of clamp means on each side of the longitudinal axis of the boom, each pair being disposed at an angle with respect to this axis to define with the other a V-shaped arrangement, which results in concurring the butt ends of the grappled trees towards the longitudinal axis of the boom.

In another form of the invention, the clamp means of each set are so arranged that, when they are closed in a tree gripping operation, they cause the butt ends of the grasped trees to this axis of the boom. This is achieved by placing the outermost clamp means of a set, relative to the axis of the boom, rearwardly of the other clamp means.

The present invention is also concerned with an apparatus for delimbing felled trees on which is mounted a dual head delimber as described above.

The scope of applicability of the present invention will become apparent from the detailed description given hereinafter; it should be understood, however, that this description, while indicating preferred embodiments of the invention, is given by way of illustration only since various changes and modifications within the spirit and scope of the invention will become apparent to those skilled in the art.

IN THE DRAWINGS

FIG. 1 is an elevational view of a tree delimbing vehicle displaying a dual head delimber made in accordance with the present invention;

FIG. 2 is an enlarged elevational view of the boom processing unit and of the dual head delimber;

FIG. 3 shows the delimbing operation;

DESCRIPTION OF PREFERRED EMBODIMENTS

Figure 4:
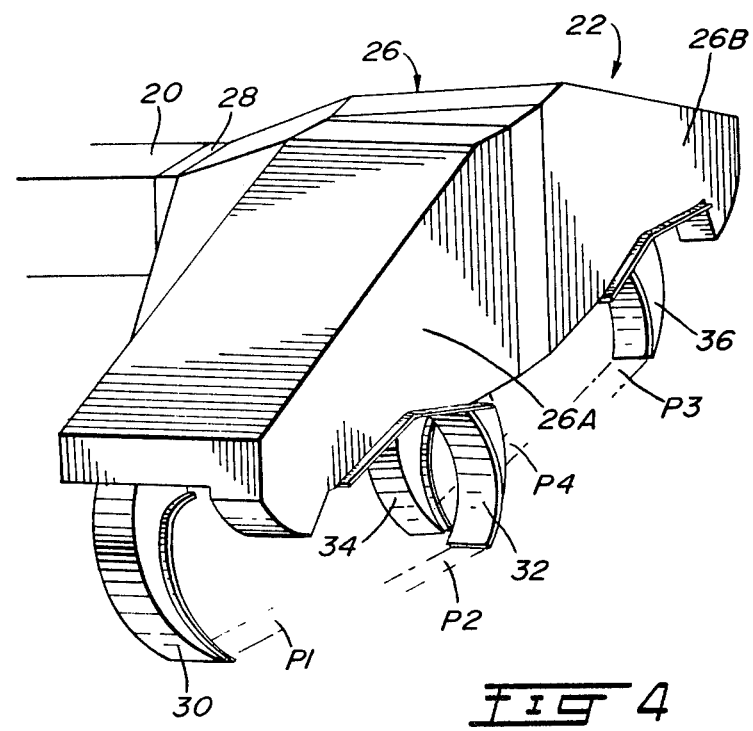
FIG. 4 is a perspective view of one embodiment of the dual head delimber.

Referring to FIG. 1 there is shown a tree processing vehicle, generally denoted 10 which broadly comprises a cabin 12 from which an operator may control both the motor and the various movable components of the vehicle. The vehicle also comprises a hingedly connected trailer portion 14 on which is mounted a rotatable table 16, with a counterweight 17, supporting a boom processing unit 18 through which extends a longitudinal boom 20. The longitudinal boom may adopt various inclined positions relative to the ground by the actuation of various operating components, such as cylinders 22.

The various devices mounted inside the boom processing unit 18 in order to reciprocate the longitudinal boom 20 therethrough are well known and will not be described as they do not form part of the present invention.

The invention is particularly concerned with the provision of a dual head delimber 22 mounted at one end of the longitudinal boom.

Figure 5:
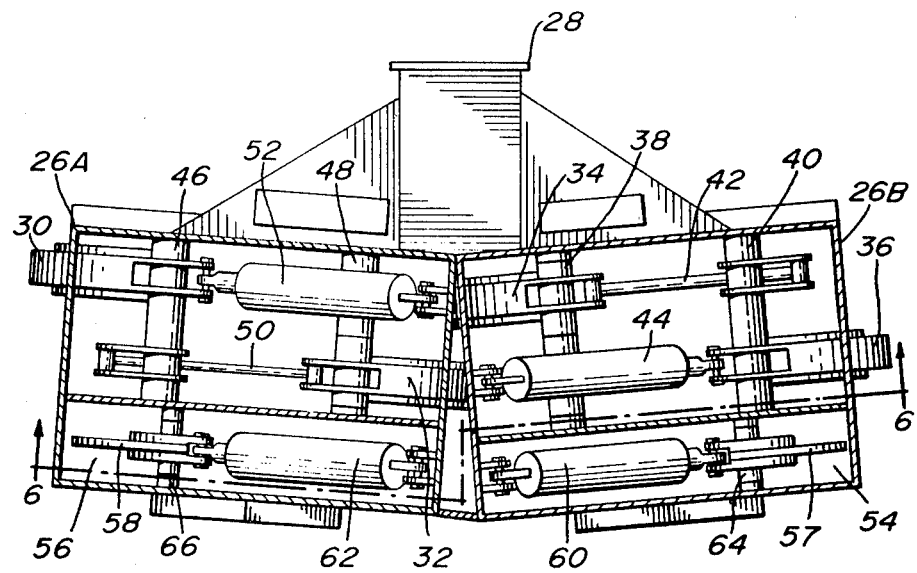
FIG. 5 is a top plan view of the dual head delimber.
Figure 6:
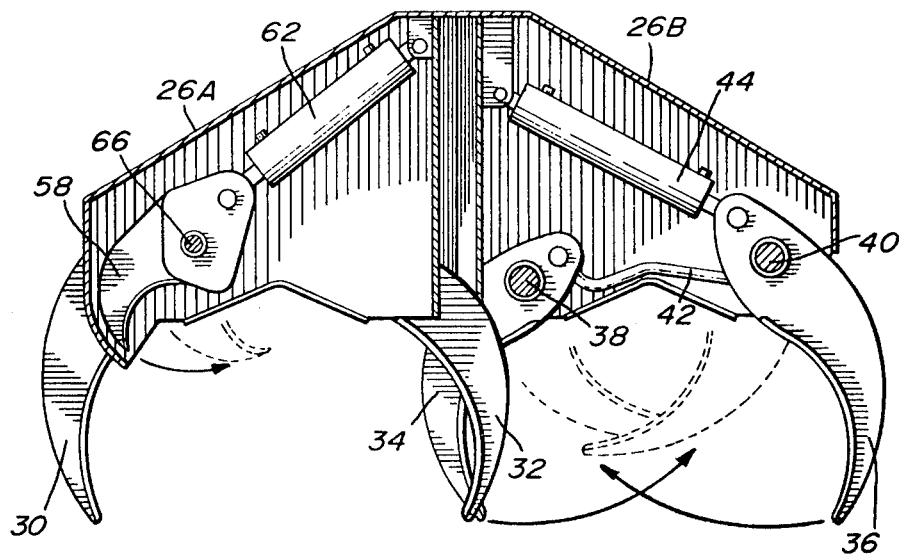
FIG. 6 is an elevational cross-section taken along lines 6—6 of FIG. 5.

Referring to FIGS. 4, 5 and 6, a first embodiment of a dual delimber made in accordance with the present invention is shown and comprises a cradle structure 26 having one end 28 adapted to be fixedly mounted to the end of the longitudinal boom 20. The cradle structure defines a housing having an opened bottom from which downwardly extends two sets of clamping elements; 30 and 32 extending from the cradle portion 26A and 34 and 36 extending from the cradle portion 26B.

Referring to FIG. 6, the construction and operation of one set of clamping elements 34 and 36 will now be described. Clamping element 34 is pivotally mounted to the cradle housing about an axis 38 while clamping element 36 is pivotally mounted about an axis 40. The two clamping elements are interconnected by means of a link member 42. A single drive cylinder 44, either pneumatic or hydraulic, is used for causing pivotal movement of both clamping elements and for adopting a tree grasping position such as shown by the dotted lines. Cylinder 44 has one end pivotally attached to the cradle housing and the other end pivotally attached to the clamping element 36. The operation of the cylinder piston causes the pivotal movement of clamping element 36 about axis 40 while the linking element 42 provides the pivotal movement of clamping element 34 about axis 38.

The construction and operation of clamping elements 30 and 32 are similar to that of clamping elements 34 and 36; this is achieved from parts corresonding to those described above in connection with clamping elements 34 and 36, which parts include pivot axes 46 and 48, linking member 50 and an hydraulic (or pneumatic) cylinder 52.

Mounted in the front part of each cradle portion 26A and 26B are two chambers 54 and 56 having opened bottoms from which may respectively extend pivoting knives 57 and 58. These knives are respectively driven by cylinders 60 and 62 which causes the actuation of the knives about their respective axis 64, 66.

In each cradle portion 26A, 26B, the clamping elements are disposed in two adjacent working planes as indicated by P1 and P2, P3 and P4 in FIG. 4. The planes P1 and P2 are parallel to one another; similarly, planes P3 and P4 are parallel to one another. However, planes P1 and P2 are disposed at an angle with respect to the longitudinal axis of the boom while planes P3 and P4 are set, on the other side of the boom, also at an angle with respect to the longitudinal axis of the boom whereby the planes define together a V-shaped arrangement. This particular construction for the clamping element assists in bringing the butt ends of the grappled trees towards the longitudinal axis of the boom.

Figure 7:
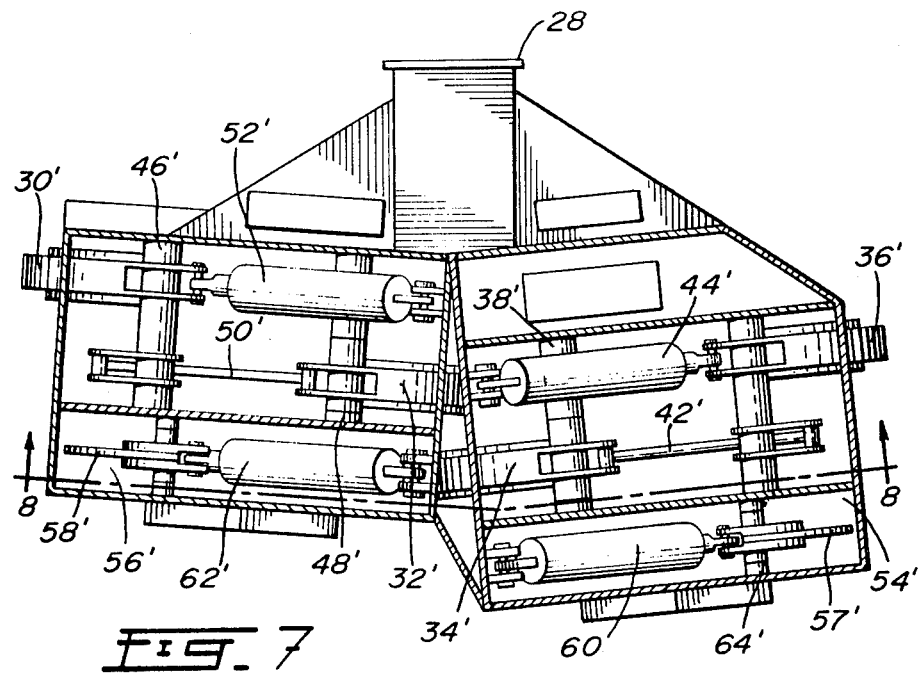
FIG. 7 is a top plan view of another embodiment of a dual head delimber made in accordance with the present invention.
Figure 8:
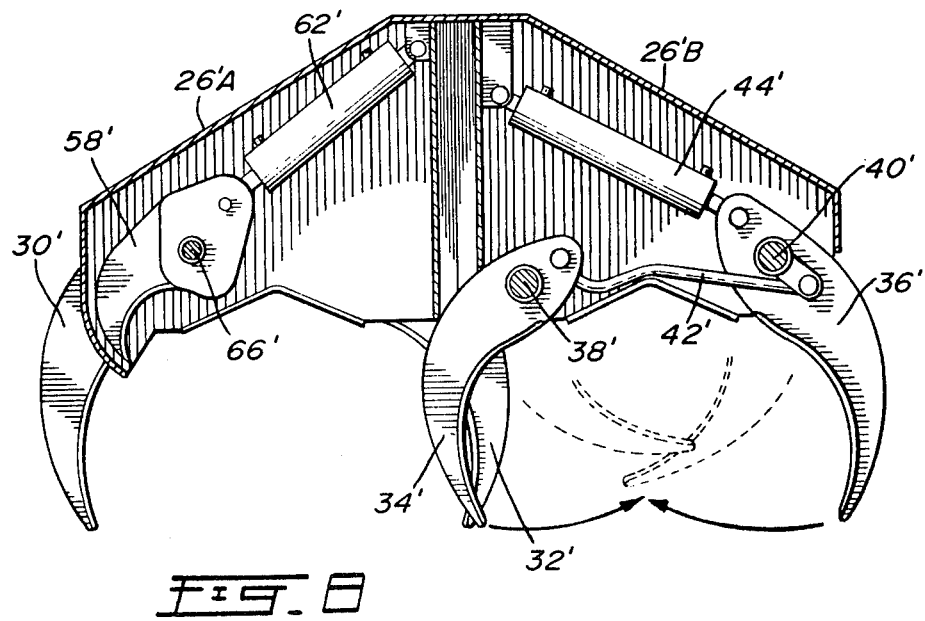
FIG. 8 is an elevational cross-section taken along line 8—8 of FIG. 7.

In FIGS. 7 and 8, a second embodiment of the present invention is illustrated with components constructed and operating in identical fashion to those illustrated and described in connection with FIGS. 5 and 6. Hence, the same numerals have been used and differentiated by the sign of a prime mark. Also, in this embodiment, the construction and mounting of the components inside the cradle portion 26A are identical to that illustrated for the embodiment illustrated in FIGS. 4, 5 and 6. However, the construction of the cradle structure is different in that cradle portion 26B is offset with respect to cradle portion 26A. FIGS. 7 and 8 shows that the outermost clamping elements 30' and 36' in both sets are those which are closest to the butt ends of the trees or to the longitudinal boom. By having an arrangement where the frontmost clamping elements of the sets are those closest to the longitudinal axis of the boom and the rearmost clamping elements furthest away from the said axis, there results a grasping operation of the trees which causes the butt ends of the grasped trees to concur towards the longitudinal axis of the boom. The offsetting construction of the two cradle portions 26A and 26B is required in order to prevent the inner clamping elements 32' and 34' from contacting one another when they are in the open position.

It is recognized that in the embodiment illustrated in FIGS. 4, 5 and 6, the disposition of clamping elements 34 and 36 relative to one another does not lend to a concurring effect similar to that obtained with clamping elements 30 and 32 since the plane of clamping element 36 is disposed frontwardly relative to the plane of clamping element 34. However, it has been observed that a skilled operator is still capable of working with such an arrangement without having the butt ends of the grasped trees moving too far away from the longitudinal axis of the boom.

In order to further assist the concurring effect of the clamping elements on grasped trees, the boom processing unit 18 includes a cone-shaped funnel 70 (see FIGS. 2 and 3) which the butt ends of the grasped trees contact when moved rearwardly by the head delimber 22. Disposed rearwardly of the funnel 70 are a pair of clamping elements 72 and 74 which are mounted to opposite sidewalls of the boom processing housing and which are operated by a pair of driving cylinders 76 and 78 also respectively mounted to the sidewalls of the boom processing unit. Rearwardly of the clamping elements 72 and 74 is a back plate 80 which serves to abut the butt ends of the grasped trees when moved rearwardly. This back plate 80 is retractable by means of a cylinder 82 mounted to the housing should it be desired to further move rearwardly the butt ends of the grasped trees.

In operation, the operator, in his cabin 12, controls the displacement of the longitudinal boom 20 relative to the boom processing unit and the displacement of the latter relative to the table 16 which is rotatable on the rear section 14 of the vehicle. Dual head delimber 22 is brought near a pile of limbed trees, lowered with the clamping elements 30, 32, 34, 36 in the opened position. The clamping elements are then closed by the operator who actuates cylinders 44 and 52 causing one or more felled trees to be tightly embraced by each set of clamping elements. The boom 20 is then retracted, the butt ends contacting funnel 70 and being directed to the back plate 80. Then, the clamping elements 72 and 74 are closed to tightly grasp the butt ends of the trees and the cylinders 44 and 52 are once again operated to an extent where the clamping elements 30, 32, 34 and 36 loosely hold the trees. Boom 20 is then moved in the direction indicated by arrow 84 in FIG. 2, the clamping elements, in their movement, causing the delimbing of the trees. Should the length of the trees exceed the maximum distance permitted by the boom outside its boom processing unit 18, the backing plate 80 is retracted. The clamping elements of the dual head delimber are once again actuated to tightly grasp the trees. Clamping elements 72 and 74 are partially opened and the boom is retracted in the direction shown by arrow 86 in FIG. 3 moving the trees rearwardly therewith. Again, the above described delimbing operation is repeated with the clamping elements 72 and 74 tightly grasping the trees and the clamping elements 30, 32, 34 and 36 loosely embracing the trees.

Although the invention has been described above in connection with two specific forms of the invention, it is evident that it may be refined and modified in various ways. For example, there may be provided a knife assembly using a single knife for cutting the one or more trees clamped by one set and then cutting the one or more trees clamped by the other set; also, the cutting could also be done in a single stroke for both sets of clamps. Furthermore, the invention has been described with reference to a longitudinal boom; this boom can be of the knuckle type where two boom sections are pivoted relative to one another. The boom can also be of the telescopic type where boom sections extend longitudinally one within the other. Hence, longitudinal boom in the present invention is meant to include any mechanism which allows a relative displacement of the head delimber relative to the trees grasped by the clamps. It is therefore wished to have it understood that the present invention should not be limited in interpretation except by the terms of the following claims.

The embodiments of the invention in which an exclusive property or privilege is claimed are defined as follows:

1. A dual head delimber for mounting to one end of the mobile boom of a machine of the type used for delimbing felled trees, the boom having a longitudinal axis, comprising:
   a cradle structure adapted to be fixedly mounted to said one end of said boom;
   two sets of clamp means pivotally mounted to said cradle structure, the sets being juxtaposed to one another and mounted so that at least one set of said clamp means is disposed at an angle to the longitudinal axis of said boom so that said clamp means define a V-shaped arrangement and effect convergence of the butt ends of two grappled trees received by said clamp means toward a vertical plane including the longitudinal axis of said boom; and
   driving means mounted in said cradle structure and connected to said clamp means for pivoting the clamp means of each set toward and away from one another to grapple one or more felled trees for delimbing.

2. A dual head delimber as defined in claim 1 further comprising a single funnel-shaped member mounted to said boom for guiding the butt ends of two grappled trees so that they converge toward said vertical plane including the longitudinal axis of the boom.

3. A dual head delimber as defined in claim 1, wherein the clamp means of each set are driven in adjacent parallel working planes, each set being disposed on either side of the longitudinal axis of the boom.

4. A dual head delimber as defined in claim 1, wherein the outermost clamp means of one set relative to said boom extends in a plane which includes the innermost clamp means of the other set.

5. A dual head delimber as defined in claim 1, wherein the innermost clamp means of each set relative to said boom are disposed in adjacent planes; the outermost clamp means in a set being the closest in said set to the butt ends of the grappled trees to thereby assist in the converging of said butt ends towards said vertical plane.

6. A dual head delimber as defined in claim 1, wherein said driving means consist of a single hydraulic cylinder for both clamp means of a set whereby the clamp means of each set are simultaneously actuated when driven.

7. A dual head delimber as defined in claim 1, further comprising means in said cradle structure for cutting top ends of grappled trees; and drive means for actuating said cutting means.

8. A dual head delimber as defined in claim 7, wherein said cutting means consist of a pair of pivotable blades disposed on either side of the longitudinal axis of said boom and said drive means consist of a pair of hydraulic cylinders for respectively pivoting said blades.

9. Apparatus for delimbing felled trees comprising:
   a vehicle;
   a boom processing unit supported on said vehicle;
   an extendable and retractable longitudinal boom mounted through said structure;
   a dual head delimber mounted at one end on said boom;
   said delimber comprising a cradle structure fixedly mounted to said one end of said boom;
   two sets of clamp means pivotally mounted to the cradle structure in juxtaposition to one another;
   driving means connected to the clamp means for pivoting the clamp means of each set towards and away from one another to grapple one or more felled trees for delimbing;
   tree gripping means mounted to said boom processing unit for grasping the trees adjacent the butt ends thereof after the felled trees have been grasped by said sets of clamp means; and
   means for converging the butt ends of grasped trees towards one another adjacent said tree gripping means.

10. An apparatus as defined in claim 9, wherein said tree grippping means consist of a pair of clamp means pivotally mounted to said boom processing unit.

11. An apparatus as defined in claim 9, wherein said converging means include a single funnel-shaped member mounted to said boom processing unit for guiding the butt ends of trees to said tree gripping means.

12. An apparatus as defined in claim 9, wherein said boom processing unit includes a butt plate pivotally mounted thereto rearwardly of said tree gripping means.

13. An apparatus as defined in claim 10 wherein said boom processing unit includes a butt plate pivotally mounted thereto rearwardly of said tree gripping means.

14. An apparatus as defined in claim 11 wherein said boom processing unit includes a butt plate pivotally mounted thereto rearwardly of said tree gripping means.

* * * * *